United States Patent

[11] 3,607,569

| [72] | Inventor | Joseph L. Greenwell |
| | | 8320 S.W. 151 St., Miami, Fla. 33158 |
| [21] | Appl. No. | 809,581 |
| [22] | Filed | Mar. 24, 1969 |
| [45] | Patented | Sept. 21, 1971 |

[54] MAGNETIC MOLD MEANS FOR MOLDING STEEL-REINFORCED HOLLOW BODIES
10 Claims, 13 Drawing Figs.

[52] U.S. Cl. ............................................. 156/500,
100/299 M, 156/212, 156/380, 264/22, 264/24
[51] Int. Cl. ........................................... B29c 3/00
[50] Field of Search............................................ 156/380,
405, 500, 212; 100/299 M; 18/DIG. 33; 264/22, 24

[56] References Cited
UNITED STATES PATENTS

| 2,479,248 | 8/1949 | Moore et al. | 100/299 M |
| 3,195,207 | 7/1965 | Fougea | 25/118 |
| 3,248,758 | 5/1966 | Schmitz et al. | 18/42 |
| 3,507,735 | 4/1970 | Chisholm | 156/500 X |

Primary Examiner—Benjamin A. Borchelt
Assistant Examiner—G. E. Montone
Attorney—Lloyd J. Andres ABSTRACT: A mold of uniform thickness of nonmagnetic material for molding steel-reinforced laminar self-curing semifluid material into open side hollow bodies of substantially uniform thickness including a plurality of magnets distributed around the nonmolding side of the mold for urging by magnetic attraction through the mold perforated expanded or reticular steel reinforcement material into intimate and uniform engagement with each of a plurality of semicured layers of the molding material sequentially applied to the molding side of the mold to form a laminar steel-reinforced body of predetermined substantially uniform thickness when the material is cured.

PATENTED SEP 21 1971

INVENTOR.
JOSEPH L. GREENWELL
BY
Lloyd Johnson

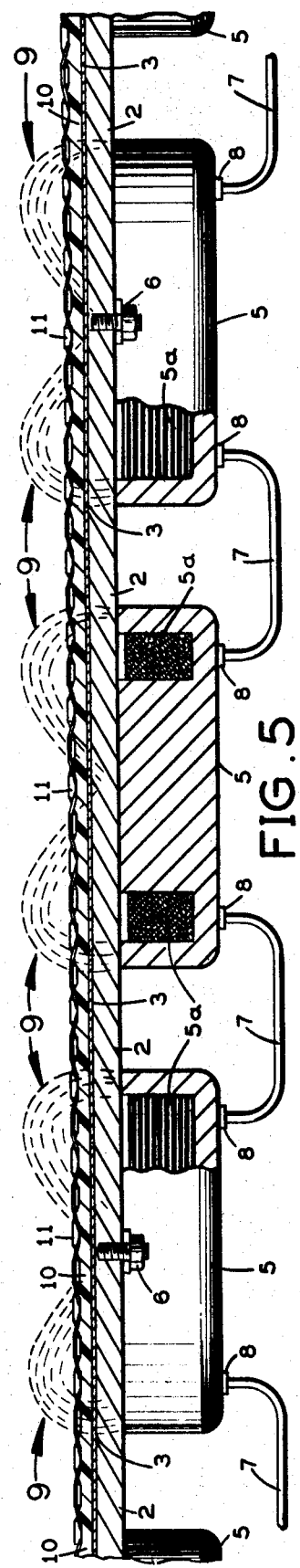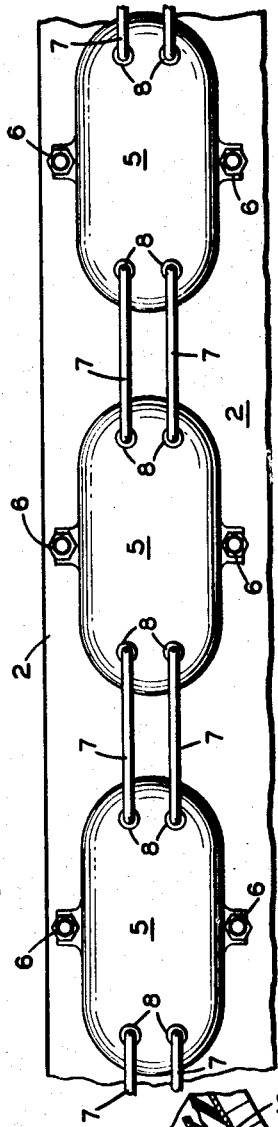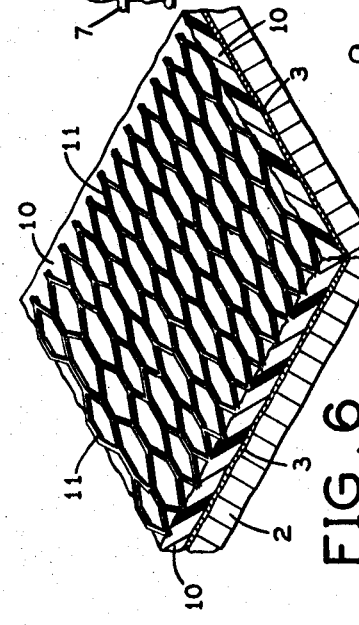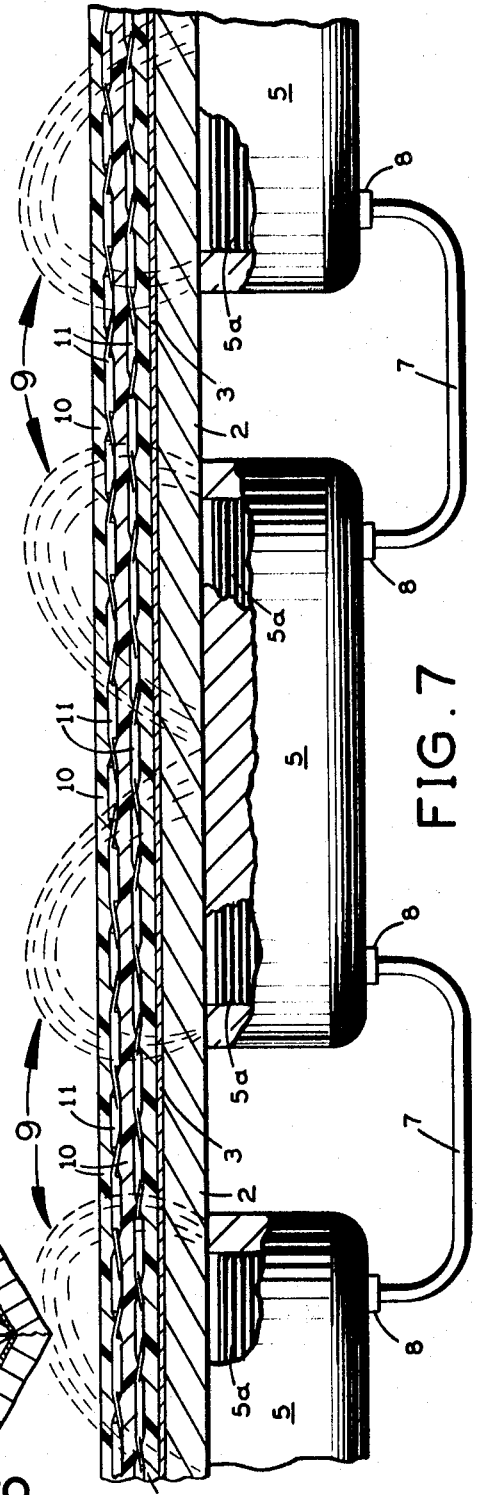

INVENTOR.
JOSEPH L. GREENWELL
BY
Lloyd Lindren

MAGNETIC MOLD MEANS FOR MOLDING STEEL-REINFORCED HOLLOW BODIES

This invention relates in general to the molding of open side hollow bodies, such as boat and barge hulls and modular portions of small buildings by the application of magnetic field attraction through the wall of the mold for urging steel reinforcement into intimate contact with each layer of self-curing plastic material applied as a laminar structure during the curing process of the plastic material.

Prior bodies of this character were molded by applying successive layers of self-curing plastic material, such as polyester resin, epoxy or cement base material, to the molding side of a mold and applying steel reinforcement by hand methods into each layer thereof for reinforcing a laminar structure which require a high degree of labor and skill in positioning the steel reinforcement with respect to each layer of plastic material, and often resulted in failure due to nonuniformity of placement of the reinforcement within the plastic layers and the presence of undesirable voids.

The present invention overcomes the above objections and disadvantages by the provision of a mold of substantially uniform thickness made of diamagnetic material on which a magnetic means is secured on the outer nonmolding side of the mold for producing attractive magnetic flux through the thickness of the mold with uniform pulling force for uniformly and intimately urging steel reinforcement members into each semicured layer of the particular semifluid material applied, thus overcoming the many difficulties involved in manually placing the reinforcement material, which construction and method is a principal object of the invention.

Another object of the invention is the provision of a mold for molding steel reinforced self-curing semifluid material into rigid open side hollow bodies in which a mold of diamagnetic material having proper release draft includes a plurality of spaced permanent or electric energized magnets are secured to the nonmolding sides thereof for providing a magnetic flux to penetrate the thickness of the mold and urge magnetic materials into intimate engagement with the molding material toward the surface of the entire molding side of the mold.

These and other objects and advantages in one embodiment of the invention are described and shown in the following specification and drawings, in which:

FIG. 4 is fragmentary view of a plurality of electromagnets secured to the outer side of a mold.

FIG. 5 is a fragmentary cross-sectional view of the electromagnet mold in which a steel-reinforcement mesh is attracted into a first layer of plastic material applied to the mold.

FIG. 6 is a perspective view of a fragmentary portion of the mold showing the stretched-apart reticular steel reinforcement shown in FIG. 5 uniformly imbedded in a plastic material.

FIG. 7 is an enlarged view of a magnetic mold in which a homogeneous laminated body is molded with a plurality of plastic material and steel reinforcement of the type shown in FIG. 6.

Figure 1:
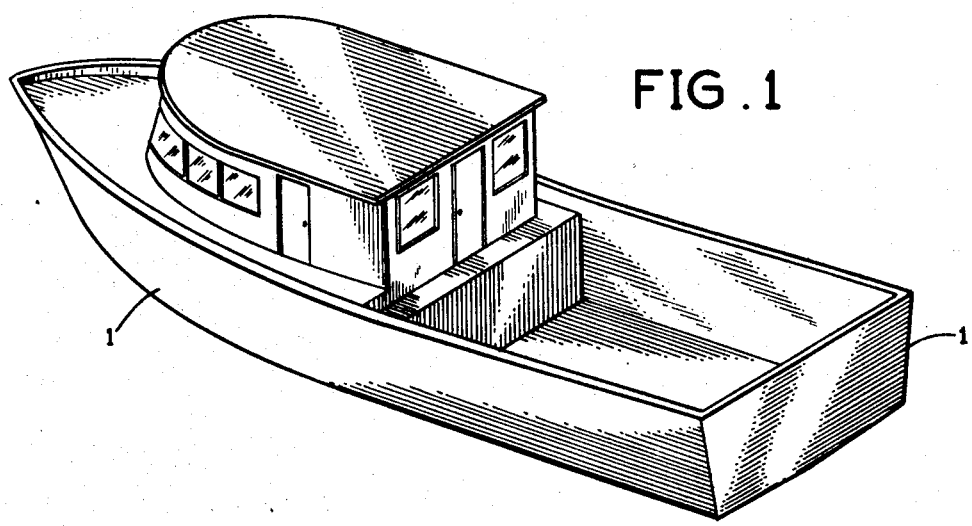
FIG. 1 illustrates a boat which has a one-piece hull molded from a self-curing semifluid material of high viscosity.
Figure 3:
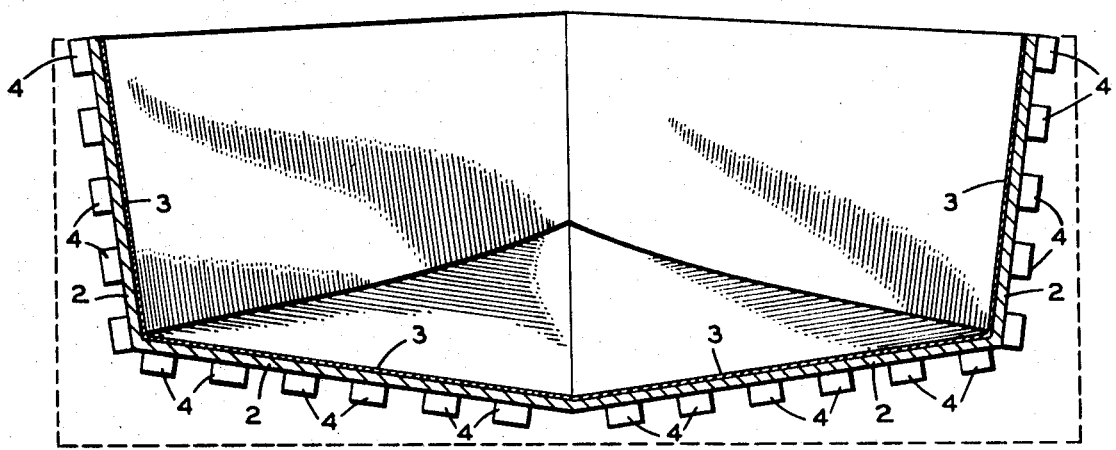
FIG. 3 is an enlarged rear cross-sectional view taken through section line 3—3, FIG. 2.
Figure 2:
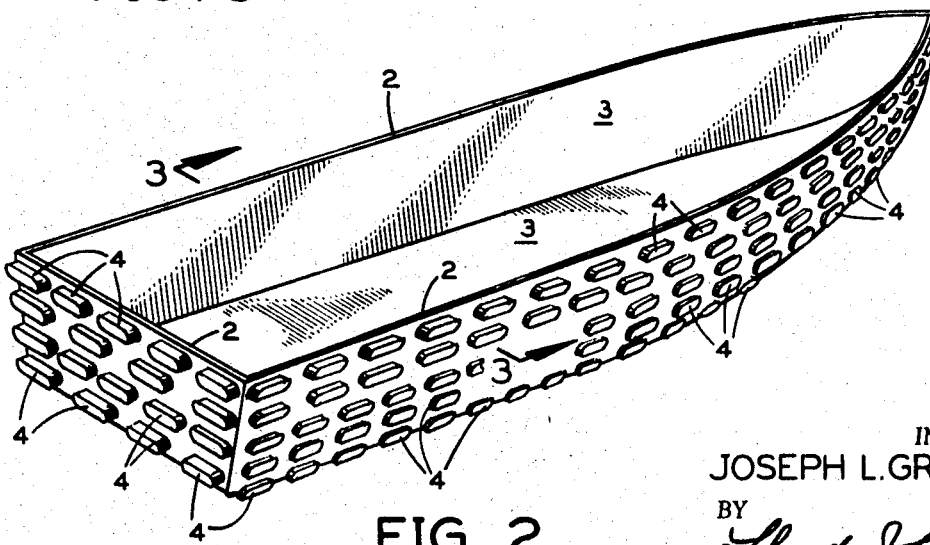
FIG. 2 is a female-form mold for molding a boat hull, such as shown in FIG. 1, with permanent magnets attached to the sides and bottom thereof.

Referring to FIG. 1, a hull 1 illustrated, is a one-piece molding of substantially uniform thickness molded of homogeneous laminated self-curing semifluid material of high viscosity with steel reinforcement and made in an open mold, such as illustrated in FIGS. 2 and 3, with the broken lines illustrating the support means for the mold.

The body 2 of the mold having an outward divergent taper is formed of diamagnetic material, such as hard wood or nonmagnetic composition or metal, and lined with a well-known parting agent 3 which may be made of well-known materials, such as wax, nylon, or silicone compound, or other material noncompatible with the molding material.

A plurality of rows of permanent magnets 4 are secured to the outer sides and bottom of the mold by adhesive means, not shown, in a predetermined orderly spaced relation. The magnets are preferably poled transverse their length for producing a relatively uniform magnetic field extending through the mold and attractive at a distance above the inside surfaces thereof to steel or other ferrous material.

It is to be noted that transverse poled elongated ferric oxide elastomer strips may be substituted for the individual magnets shown with substantially equal results for molding relatively small bodies, such as small boats.

Referring to FIGS. 4 and 5, a plurality of elongated well-known electromagnet assemblies 5, similar to the "lifting" type, may be secured by well-known fasteners 6, as shown, to the outer or inner surface of a mold depending on whether the mold is male or female. A plurality of plug-in patch cord conductors 7 and their corresponding sockets 8 are adapted to connect pluralities of the electromagnet windings 5a in parallel or in series or series-parallel as may be required in practice.

Since the central pole and the outer rim pole of the magnet are of opposite polarity when the magnet is energized, the magnetic flux 9, illustrated by broken lines, will extend through the wall of the mold and attract any iron or steel body in near proximity with the molding surface of the mold.

FIG. 6 illustrates a portion of the body 2 of the mold which is covered by a well-known parting agent 3. A layer of one of the self-curing semifluid materials 10, of uniform thickness, is then applied over the parting material.

It is to be noted that large varieties of plastic materials may be used in connection with the molds and the reinforcement described, such as cement base compounds, polyester resins, epoxy compounds and various concrete mixtures. While the material is still in a plastic state, the stretched-apart steel reinforcement 11, or other steel reinforcement, is positioned over the resin which will be attracted into intimate contact with the plastic material and toward the surface of the mold a predetermined distance by the pull of the magnets 4 or the electromagnet assemblies 5 when the latter are energized for a predetermined period of time.

Figure 8:
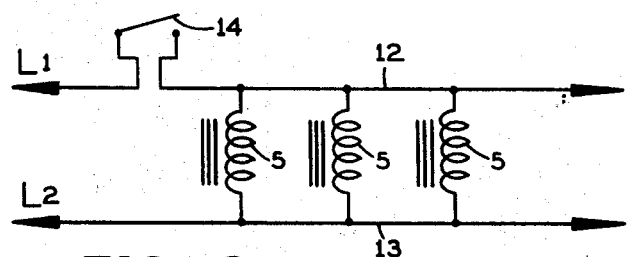
FIG. 8 is a schematic circuit diagram for energizing the magnets shown in FIGS. 4 and 5.

FIG. 8 illustrates a schematic diagram of a plurality of electromagnet assemblies 5 parallel connected to conductors 12 and 13 and through a normally open electric switch 14 to a source of electric power $L_1$ and $L_2$.

It is to be noted that well-known electric controls may be used in the energizing circuit to vary the magnetic attraction of the magnets to suit specific conditions.

Figure 9:
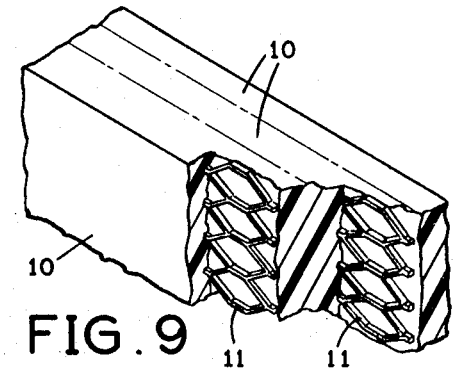
FIG. 9 is a fragmentary perspective view of three homogeneous layers of plastic material reinforced by two layers of reticular steel reinforcements.

FIG. 9 illustrates a fragmentary portion of the wall of a homogeneous formation of three layers of molding material 10 with two layers of stretched-apart steel reinforcement 11.

It is to be noted that several other forms of steel webbing or screen, such as the cross-welded material commonly used in concrete, may be magnetically impressed in one or more of the layers of the semicured material.

The same type of molding previously described may be enlarged for use in the manufacture of one-piece barge hulls as well as modular buildings molded from steel-reinforced concrete mixed with one or more kinds of desirable aggregate.

Figure 10:
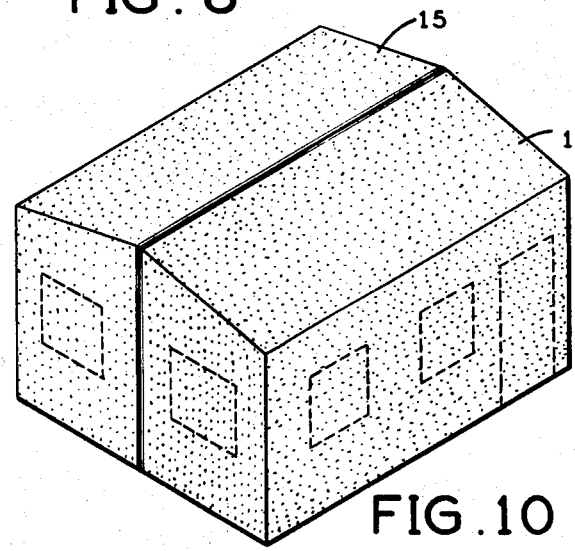
FIG. 10 illustrates a pair of independently molded hollow casings secured together forming a house.
Figure 11:
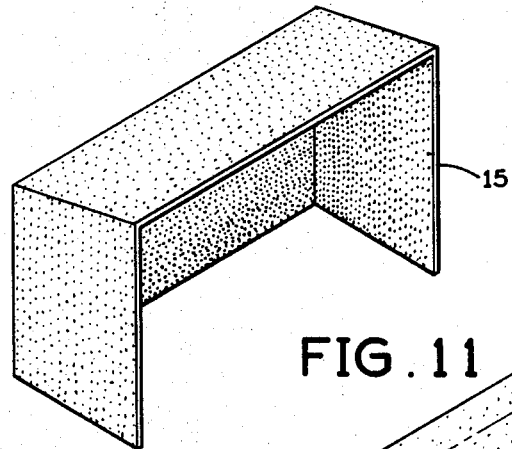
FIG. 11 illustrates one of the molded casings shown in FIG. 10.
Figure 12:
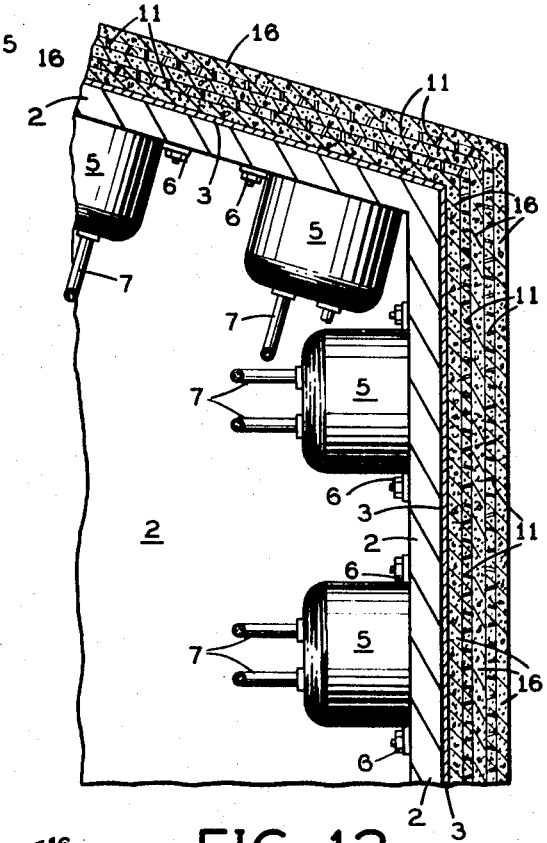
FIG. 12 illustrates a fragmentary portion of a male form of mold in which the homogeneous multilayer steel-reinforced self-curing cement base material is molded thereon.

FIGS. 10 and 11 illustrate a low-cost building comprising two open side hollow bodies 15, preferably formed on a male-type mold, secured together by well-known means for mounting on a planar floor of concrete or other material.

It is also apparent that the floor of the building may also be molded integral with the body as a fifth side thereof.

Figure 13:
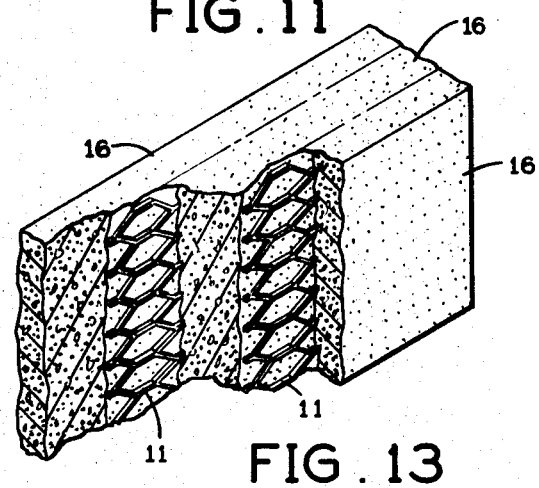
FIG. 13 is a fragmentary perspective view of a homogeneous portion of the concrete multilayer steel reinforced cement base material of the casing formed in FIG. 12.

This type of large body usually requires a male mold, having suitable draft, on which the parting agent 3 is applied to the outside surface of the mold and the concrete 16 is applied with the steel reinforcement drawn into each layer by momentarily energizing the magnet assemblies 5 during the placement of the steel reinforcement. This operation is repeated until the desired number of layers of concrete and steel reinforcement is attained, such as illustrated in FIG. 13.

This invention comprehends modifications in construction within the teachings and spirit of the above specification.

Having described my invention, I claim:

1. A hollow mold made of nonmagnetic material of substantially uniform thickness having an open side with the inside surface of said mold having a predetermined form for shaping the external surface of the body to be molded,
    a plurality of magnet means in spaced relation on the outside surface of said mold to produce a magnetic field extending through the said inside surface of said mold for attracting ferrous material toward said inside surface,
    a layer of self-curing plastic material of substantially uniform thickness applied to the said inner surface of said mold,
    a plurality of sheets of steel mesh material for reinforcing said plastic material manually positioned on said layer of said plastic material for intimate engagement therein and urged into a like predetermined depth in said plastic material by the attraction of said magnetic field.

2. The construction recited in claim 1 including a substantially uniform thin layer of parting material applied to the said inner surface of said mold prior to the application of said layer plastic material.

3. The construction recited in claim 1 including a predetermined number of layers of said plastic material applied to said first layer of said plastic material with an additional plurality of sheets of steel mesh material between each of said layers forming a one piece laminar body removable from said open side of said mold.

4. The construction recited in claim 1 wherein the said magnetic means comprise a plurality of like permanent magnets in spaced relation on the outside surface of said mold to produce an attractive said magnetic field force through the wall of said mold.

5. The construction recited in claim 1 including a plurality of electromagnets in spaced relation on the outside surface of said mold to produce an attractive said magnetic field force through the wall of said mold,
    a source of electric power,
    a circuit means connecting said source of energy with said electromagnets for producing said magnetic field.

6. The construction recited in claim 1 wherein said plastic material is a self-curing polyester resin.

7. A hollow mold of nonmagnetic material of substantially uniform thickness having an open side with the outer surface thereof having a predetermined form for shaping the internal surface of the body to be molded,
    A plurality of magnetic means in spaced relation on said inside surface of said hold mold to produce a magnetic field extending through said outer surface of said mold for attracting ferrous material toward said outside surface,
    a layer of self-curing plastic material of substantially uniform thickness applied to the outer surface of said plastic mold,
    a plurality of sheets of steel mesh materials for reinforcing said plastic material manually positioned on said layer of said plastic material for intimate engagement therein and urged into a like predetermined depth in said plastic material by the attractive force of said magnetic field.

8. The construction recited in claim 7 wherein the said plastic material is a self-curing semifluid cement base compound of high viscosity.

9. A hollow mold made of nonmagnetic material of substantially uniform thickness having an open side with the outside surface of said mold having a predetermined form for shaping the internal surface of the body to be molded,
    a plurality of electromagnets in spaced relation on the inside surface of said mold to produce a magnetic field extending through the said outside surface of said mold for attracting ferrous material toward said outside surface,
    a layer of self-curing plastic material of substantially uniform thickness applied to the outer surface of said mold,
    a source of electric energy,
    a circuit means connecting said source of energy to said electromagnets including a normally open electric switch in said circuit,
    a plurality of sheets of steel mesh material for reinforcing said plastic material manually positioned on said layer of said plastic material for intimate engagement therein and urged into like predetermined depth in said plastic material by the attractive force of said magnetic field when energized by the closure of said switch for a predetermined time period.

10. A hollow mold made of nonmagnetic material of substantially uniform thickness having an open side with the inside surface of said mold having a predetermined form for shaping the external surface of a body to be molded of substantially uniform thickness,
    a plurality of magnetic means positioned in spaced relation on the outside surface of said mold for producing a plurality of magnetic fields extending through said inside surface of said mold for attracting ferrous material toward said inside surface,
    a parting agent applied to the said inside surface of said mold,
    a layer of self-curing plastic material of substantially uniform thickness applied over said parting agent on the inner side of said mold,
    a plurality of sheets of iron wire cloth of predetermined mesh for reinforcing said plastic material manually positioned on said outer surface of said plastic material for intimate engagement on said inside surface and urged into substantially like predetermined depth in said plastic material by the attraction of said magnetic field.